(12) United States Patent
Shahi et al.

(10) Patent No.: US 11,647,498 B2
(45) Date of Patent: May 9, 2023

(54) MANAGING TRANSMIT TIMING OF DATA TRANSMISSIONS

(71) Applicant: QUALCOMM incorporated, San Diego, CA (US)

(72) Inventors: Sharad Shahi, Boulder, CO (US); Madhup Chandra, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/342,937

(22) Filed: Jun. 9, 2021

(65) Prior Publication Data
US 2022/0400499 A1 Dec. 15, 2022

(51) Int. Cl.
*H04W 72/1268* (2023.01)
*H04W 72/0446* (2023.01)
*H04W 72/0453* (2023.01)

(52) U.S. Cl.
CPC ... *H04W 72/1268* (2013.01); *H04W 72/0446* (2013.01); *H04W 72/0453* (2013.01)

(58) Field of Classification Search
CPC ......... H04W 72/1268; H04W 72/0446; H04W 72/0453; H04W 52/146; H04W 52/223; H04W 56/001; H04W 28/0231; H04W 28/0221; H04B 17/3912; H04L 5/001; Y02D 30/70
See application file for complete search history.

(56) References Cited

U.S. PATENT DOCUMENTS

| | | | |
|---|---|---|---|
| 2003/0202490 A1* | 10/2003 | Gunnarsson | H04L 1/0006 370/332 |
| 2006/0193338 A1* | 8/2006 | Zheng | H04L 5/0046 370/464 |
| 2018/0160440 A1* | 6/2018 | Hosseini | H04W 56/0045 |
| 2019/0104480 A1* | 4/2019 | Hasholzner | G06F 1/324 |
| 2019/0394713 A1* | 12/2019 | Zheng | H04W 56/0015 |
| 2020/0177266 A1* | 6/2020 | Kang | H04L 5/0051 |

FOREIGN PATENT DOCUMENTS

| | | |
|---|---|---|
| EP | 1502376 A1 | 2/2005 |
| WO | 2006090257 A1 | 8/2006 |

OTHER PUBLICATIONS

International Search Report and Written Opinion—PCT/US2022/022261—ISA/EPO—Jul. 11, 2022. 14 pages.

* cited by examiner

*Primary Examiner* — Rina C Pancholi
(74) *Attorney, Agent, or Firm* — The Marbury Law Group, PLLC

(57) ABSTRACT

Various embodiments may provide systems and methods for managing transmit (TX) timing of data transmissions. The methods include applying a plurality of radio frequency (RF) channel factors related to data uplink transmissions by the wireless device to a TX timing model configured to provide as an output a TX timing for a data transmission to a base station and a number of carriers for sending the data transmission, and selecting a TX time and a number of carriers for sending a next data transmission to the base station based in part on the TX timing model output.

28 Claims, 8 Drawing Sheets

MANAGING TRANSMIT TIMING OF DATA TRANSMISSIONS

BACKGROUND

Long Term Evolution (LTE), 5G new radio (NR) (5GNR), and other recently developed communication technologies allow wireless devices to communicate information at data rates (e.g., in terms of Gigabits per second, etc.) that are orders of magnitude greater than what was available just a few years ago. These and other recent improvements have facilitated the emergence of the Internet of Things (IoT), large scale Machine to Machine (M2M) communication systems, autonomous vehicles, and other technologies that enable a network element (e.g., a server) to receive data transmissions from a plurality of wireless devices (e.g., mobile phones, sensors, etc.).

Wireless communication links are affected by radio frequency (RF) conditions, which involve numerous factors that may fluctuate and/or interact in a complex manner. Wireless devices typically include a battery or other power storage device. RF conditions can impact wireless transmission performance, which can impact wireless device battery endurance. For example, under poor RF conditions, a wireless device may need to transmit data messages at a higher transmit power to achieve acceptable transmission performance (e.g., bit error rate) in transmissions to a base station or another wireless device than would be required to transmit the data message under average or above average RF conditions. Transmitting messages at higher transmit power levels consumes more battery power than when messages are transmitted at average or lower than average transmit power levels, thus transmitting data messaged under poor RF conditions reduces the battery endurance of the wireless device.

SUMMARY

Various aspects include methods that may be performed by a processor of a wireless device for managing transmit (TX) timing of data transmissions. Various aspects may include applying a plurality of radio frequency (RF) channel factors related to data uplink transmissions by the wireless device to a TX timing model configured to provide as an output a TX timing for a data transmission to a base station and a number of carriers for sending the data transmission, and selecting a TX time and a number of carriers for sending a next data transmission to the base station based in part on the TX timing model output.

In some aspects, the number of carriers for sending the data transmission provided as an output of the TX timing model may be based on a balancing of TX power and TX performance of the data transmission. In some aspects, the TX timing model may be configured to perform a maximization operation of a TX performance value multiplied by a TX performance weight value less a TX power value multiplied by a TX power weight value. In some aspects, applying a plurality of RF channel factors related to data uplink transmissions by the wireless device to a TX timing model configured to provide as an output TX timing for a data transmission to a base station may be performed in response to storing data in an uplink buffer. In some aspects, applying a plurality of RF channel factors related to data uplink transmissions by the wireless device to a TX timing model configured to provide as an output TX timing for a data transmission to a base station may be performed periodically.

In some aspects, selecting a TX time for a next data transmission to the base station based in part on the TX timing model output may include selecting an uplink (UL) opportunity granted to the wireless device in a received physical downlink control channel (PDCCH). In some aspects, the TX timing model may be configured to provide as an output a TX power for the next data transmission. In some aspects, the TX timing model may be configured to provide as an output the TX timing for the next data transmission to the base station based on a prediction of RF channel conditions. Some aspects may include sending to the base station a UE Assistance Information element (UAI) including recommendation information based on the output of the TX timing model.

In some aspects, the plurality of RF channel factors over a period of time applied to the TX timing model may include one or more of a signal to noise ratio (SNR), a reference signal receive power (RSRP), a reference signal receive quality (RSRQ), demodulation reference signal (DMRS) information, or channel state information reference signal (CSI RS) information. In some aspects, the plurality of RF channel factors applied to the TX timing model may include uplink grant information obtained from previously-received physical downlink control channel (PDCCH) messages. In some aspects, the plurality of RF channel factors applied to the TX timing model may include wireless device battery level information. In some aspects, the plurality of RF channel factors applied to the TX timing model may include one or more of downlink control information (DCI) failure information or cyclic redundancy check (CRC) failure information. In some aspects, the plurality of RF channel factors applied to the TX timing model may include wireless device location information.

In some aspects, the plurality of RF channel factors applied to the TX timing model may include wireless device usage information. In some aspects, the plurality of RF channel factors applied to the TX timing model may include uplink transmissions of one or more other wireless devices. In some aspects, the TX timing model may be configured to provide as an output a prediction of RF conditions. In some aspects, the TX timing model may be configured to identify a TX timing that balances TX power against wireless device power consumption. In some aspects, the TX timing model may be configured to identify a TX timing based on a balancing of TX power and a wireless device-indicated threshold TX performance of the data transmission. In some aspects, the TX timing model may be configured to identify a TX timing based on a balancing of TX performance of the data transmission and a predicted RF peak. In some aspects, the TX timing model may be configured to identify a TX timing based on a balancing of TX power against a predicted signal transmission by one or more other wireless devices.

Further aspects may include a wireless device having a processor configured to perform one or more operations of any of the methods summarized above. Further aspects may include processing devices for use in a wireless device configured with processor-executable instructions to perform operations of any of the methods summarized above. Further aspects include a wireless device having means for performing functions of any of the methods summarized above. Further aspects may include a non-transitory processor-readable storage medium having stored thereon processor-executable instructions configured to cause a processor of a wireless device to perform operations of any of the methods summarized above. Further aspects include a system on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
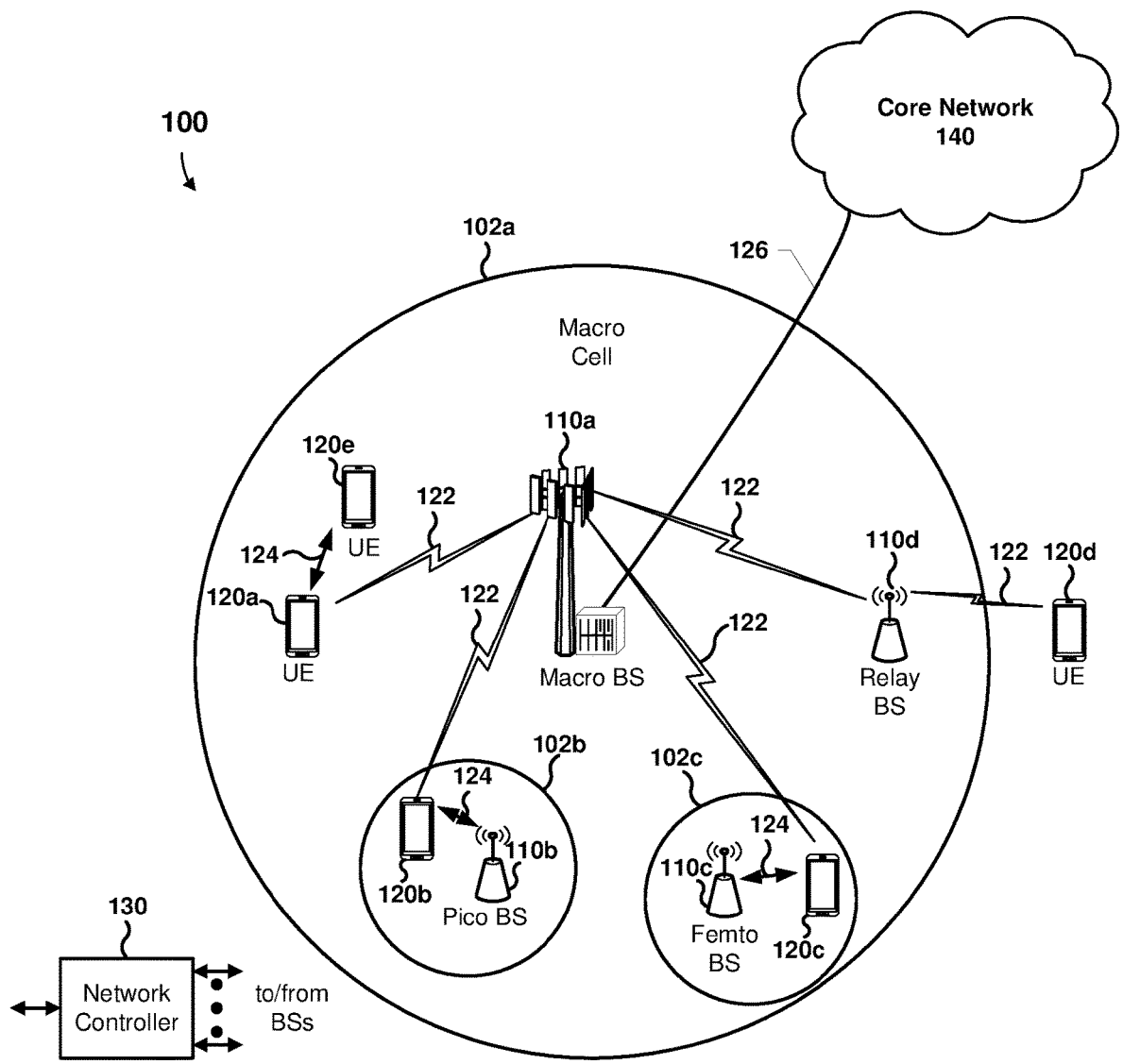
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for managing transmit (TX) timing of data transmissions that may be performed by a wireless device. In various embodiments, a wireless device may apply a plurality of radio frequency (RF) channel factors that are related to data uplink transmissions by the wireless device to a TX timing model. In some embodiments, the TX timing model may be configured to provide as an output a TX timing for data transmission to a base station and a number of carriers for sending the data transmission. In some embodiments, the TX timing model may include a machine learning model or trained neural network. Based in part on the output of the TX timing model, the wireless device may select a TX time and a number of carriers for sending a next data transmission to the base station.

In some embodiments, the TX timing model may be configured to identify times for performing data transmission (or data calls) based on or in response to varying RX channel conditions so as to balance TX power against data transmission (TX) performance. In some embodiments, the TX performance of a data call may include a signal strength or signal quality of the data transmission. In some embodiments, the TX performance of a data call may include a completeness (e.g., packet loss) or accuracy (e.g., bit error rate) of the data transmitted. For example, the wireless device may evaluate received acknowledgment (ACK), non-acknowledgment (NACK) messages, retransmission requests, and/or the like from a base station as indicators of completeness or accuracy of the data transmission.

In some embodiments, methods for balancing TX power against data TX performance may include outputting a transmission timing opportunities that trade-off the required TX power against the TX performance of a data transmission. For example, reducing TX power may decrease the TX performance of the data transmission. Similarly, increasing TX power may increase the TX performance of the data transmission. However, in some embodiments, a wireless device may transmit a data transmission at less than a maximum TX power (in some cases, substantially less than a maximum TX power) to achieve a baseline or threshold level of TX performance of the transmission. Various embodiments include systems and methods for managing transmit TX of data transmissions that may be performed by a wireless device that include performing a balancing of TX power and TX performance of the data transmission.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various examples.

In various circumstances, predicting complex RF channel conditions may enable wireless devices to manage the timing, and to balance the transmit power and TX performance, of uplink transmissions (e.g., to a communication network element). Balancing transmit power and TX performance requires a dynamic and complex determination by a wireless device. For example, a wireless device, such as a sensor, may originate a transmission of data after collecting data. Wireless communication links are affected by radio frequency (RF) conditions, which involve numerous factors (e.g., atmospheric conditions, interference from other transmitters, attenuation, multipath conditions, and the like) that may fluctuate and/or interact with RF signals in a complex manner. Wireless devices are typically powered by a battery or other power storage device that stores a limited amount of power. Poor RF conditions may require a wireless device to transmit at a higher transmit power to convey a transmission (e.g., to a base station or another wireless device) with an acceptable level of TX performance. On the other hand, favorable RF conditions may enable a wireless device to transmit a data transmission at a lower transmit power while achieving similar TX performance, thereby conserving battery power compared to transmitting during poor RF conditions. As another consideration, a plurality of sensors may attempt to send data transmissions at substantially the same time, but the communication network may be unable to grant uplink resources to all of the requesting wireless devices.

In various embodiments, a wireless device may apply a plurality of RF channel factors related to data uplink transmissions to a TX timing model configured to provide as an output a TX timing for a data transmission to a base station and a number of carriers for sending the data transmission. This TX timing model may be configured to evaluate the various RF channel factor inputs to identify times and numbers of carriers for data transmission that strike a balance between TX perform and required TX power the current and projected RF conditions. The output of the TX timing model may enable a wireless device process to select a TX time (e.g., among a number of anticipated uplink TX opportunities granted by a base station in physical downlink control channel (PDCCH) messages) and a number of carriers for sending a next data transmission to the base station that balances TX power and TX performance. In this manner, the wireless device can choose an uplink TX opportunity that balances TX power and TX performance instead of merely transmitting a data message in the next uplink TX opportunity after the message is ready for transmission.

In some embodiments, the wireless device may be configured to determine a TX time and TX power that achieves at least a threshold level of throughput for the selected TX power. In some embodiments, the wireless device may be configured to predict RF conditions and to determine the TX time and TX power based on the predicted RF conditions. In some embodiments, the wireless device may be configured to predict PDCCH uplink TX grant trends and to determine the TX time and TX power based on the predicted PDCCH uplink TX grant trends.

In some embodiments, the TX timing model may include a neural network configured to operate on a plurality of RF channel factors to output TX time and TX power preferences. In some embodiments, the RF channel factors input to the TX timing model may include current and/or predicted RF channel conditions. In some embodiments, the neural network may be configured to provide as an output a number of carriers (e.g., aggregated carriers) to be used in a next uplink data TX. In some embodiments, the RF channel factors input to the TX timing model may include current and/or historical signal-to-noise ratio (SNR), reference signal receive power (RSRP), reference signal receive quality (RSRQ), and/or similar measures of RF conditions available to the wireless device. In some embodiments, the RF channel factors input to the TX timing model may include current and/or historical demodulation reference signal (DM RS) information, channel state information reference signal (CSI RS) information, and/or similar measures of RF conditions reported to the wireless device. In some embodiments, the RF channel factors input to the TX timing model may include uplink grant information obtained from previously-received PDCCH messages. In some embodiments, the RF channel factors input to the TX timing model may include current and/or historical wireless device battery level information. In some embodiments, the RF channel factors input to the TX timing model may include downlink control information (DCI) failure information and/or cyclic redundancy check (CRC) failure information. In some embodiments, the RF channel factors may input to the TX timing model include wireless device location information. In some embodiments, the RF channel factors may include wireless device usage information, such as a number of transmissions or attempted transmissions per unit time, an amount of data transmitted in each transmission, and/or the like.

In some embodiments, the TX timing model may be configured to identify a TX timing based on balancing TX performance of the data transmission against a predicted RF peak. The predicted RF peak may include a time of relatively high RF interference (e.g., as compared to other times) from other transmitters (e.g., other wireless devices). In some embodiments, the predicted RF peak may include a predicted relative maximum RF interference from other transmitters. In some embodiments, the predicted RF peak may include a predicted RF peak in one or more channels. In some embodiments, the TX timing model may be configured to provide as an output a prediction of RF conditions, for example, for a future period of time (e.g., X milliseconds), based on the plurality of RF channel factors input to the TX timing model. In some embodiments, the TX timing model may be configured to provide as an output a prediction of an upcoming RF peak. In some embodiments, the TX timing model may be configured to provide as an output a prediction of an upcoming RF valley. The predicted RF valley may include a time of relatively low RF interference (e.g., as compared to other times) from other transmitters. In some embodiments, the predicted RF valley may include a predicted relative minimum RF interference from other transmitters. In some embodiments, the predicted RF valley may include a predicted RF valley in one or more channels. In some embodiments, the TX timing model may be configured to determine a TX timing of an uplink transmission for the wireless device that avoids a predicted RF peak (or RF valley). For example, the wireless device may output uplink TX timing preferences for uplink data transmission before a predicted RF peak or RF valley occurs. In some embodiments, the TX timing model may be configured to select one or more optimized time instants for uplink data transmission before a predicted RF peak or RF valley occurs.

In some embodiments, the RF channel factors may include uplink transmissions of one or more other wireless devices. In some embodiments, the TX timing model may be configured to provide as an output a prediction of signal transmission by one or more other wireless devices. In some embodiments, the TX timing model may be configured to determine a TX timing of an uplink transmission for the wireless device that avoids a predicted RF peak. For example, the wireless device may determine its uplink TX timing for before the predicted RF peak occurs.

In some embodiments, the TX timing model may be configured to perform a maximization operation of a TX performance value adjusted by a TX performance weight value less a TX power value multiplied by a TX power weight value. As a non-limiting example, the maximization operation may be represented as Maximize(Wperf×Performance−Wpower×Power), in which Wperf represents a TX performance weight value, Performance represents a TX power value, Wpower represents a TX power weight value, and Power represents a TX power value. In some embodiments, the wireless device may be configured to adjust the TX power weight value and/or the TX performance weight value over time based on completeness or accuracy of data transmissions. For example, the wireless device may receive one or more acknowledgment (ACK) or non-acknowledgment (NACK) messages, retransmission requests, and/or the like from a base station, which may indicate a completeness or accuracy of the data transmission, and use this information to improve the TX timing model by updating the weight values used in the model based on measured or received transmission performance information.

In some embodiments, the TX timing model may be configured to predict RF conditions, for example, for a future period of time (e.g., X milliseconds), based on the plurality of RF channel factors. In some embodiments, the TX timing model may be configured to receive as inputs context-awareness information, such as wireless device location information, wireless device usage information, and/or the like. In some embodiments, the wireless device may be configured to adjust the TX power weight value and/or the TX performance weight value over time based on the context-awareness information.

In some embodiments, the TX timing model may be configured to provide as an output a number of aggregated carriers for use by the wireless device for the data transmission. In some embodiments, the number of carriers for sending the data transmission may be based on balancing of TX power against TX performance of the data transmission. In some embodiments, the wireless device may send or report the number of aggregated carriers to a base station (or to another suitable network element) as a recommendation from the wireless device.

In some embodiments, the wireless device may send the number of aggregated carriers output by the TX timing model to a base station in a UE Assistance Information (UAI) message or another suitable message. For example, the wireless device may send the UAI to the base station in uplink radio resource control (UL RRC) signaling, Media Access Control (MAC) Control Element (MAC CE), UL control information (UCI), or another suitable message. The wireless device reporting the number of aggregated carriers to the base station may enable the base station to reduce or limit a number of activated carriers. Reducing or limiting the number of activated carriers may reduce, for example, secondary cell group (SCG) signaling from the wireless device to the base station, and may reduce power consumption by the wireless device as well as possible wireless device overheating.

Various embodiments may enable a wireless device to determine a TX timing of the data transmission (e.g., an uplink data call) that appropriately balances TX performance of the data transmission against the TX power required to make the data transmission. In various embodiments, the wireless device may be configured to estimate numerous non-linear relationships among numerous inputs received by the wireless device. In various embodiments, the wireless device may be configured to determine and/or predict extremely complex and dynamic RF fluctuations, which may include trends over time. In various embodiments, the wireless device may use such determinations and/or predictions to improve power consumption and RF resource consumption by the wireless device.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee. Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 2:
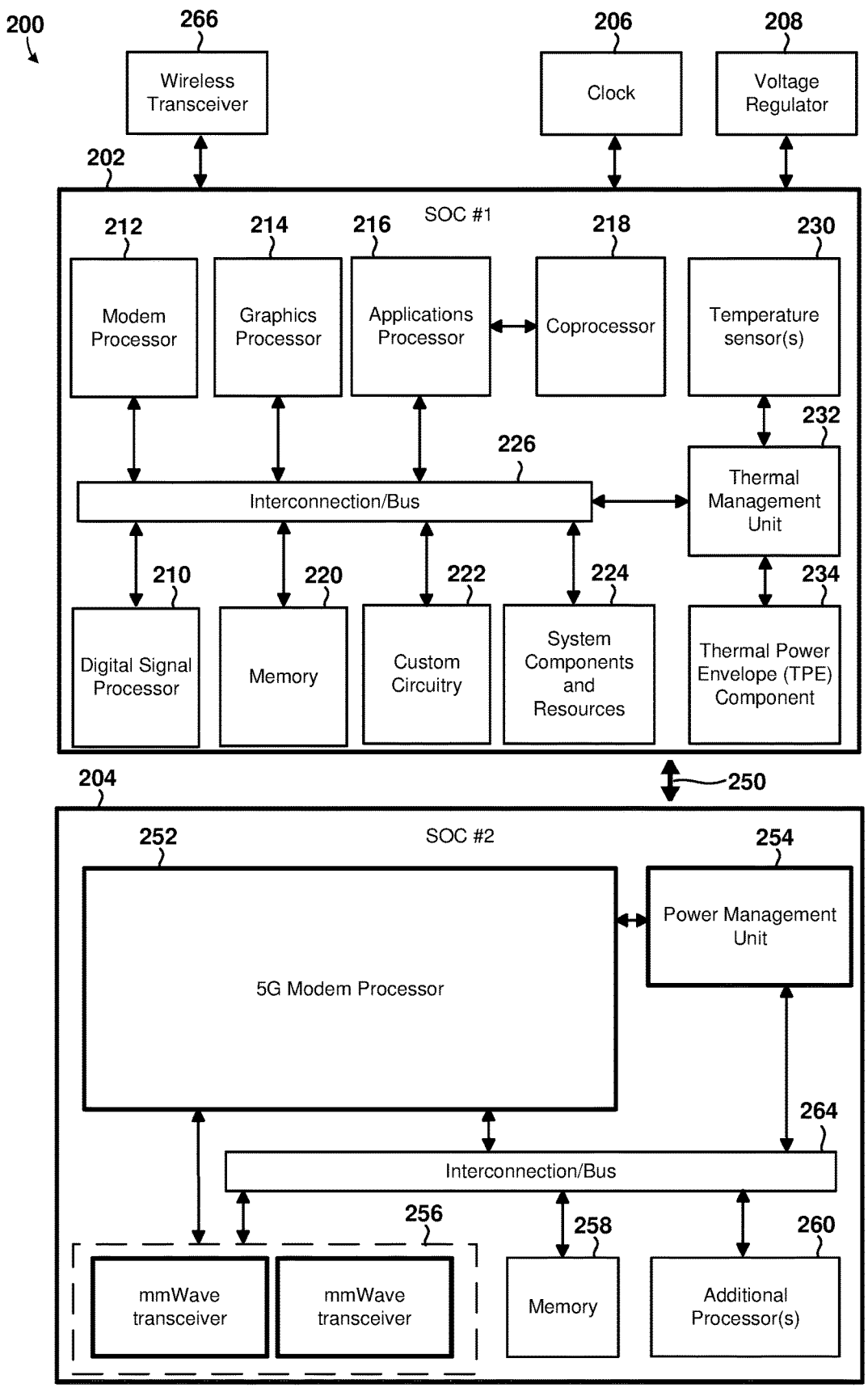
FIG. 2 is a component block diagram illustrating an example computing system and wireless modem suitable for implementing various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect. AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
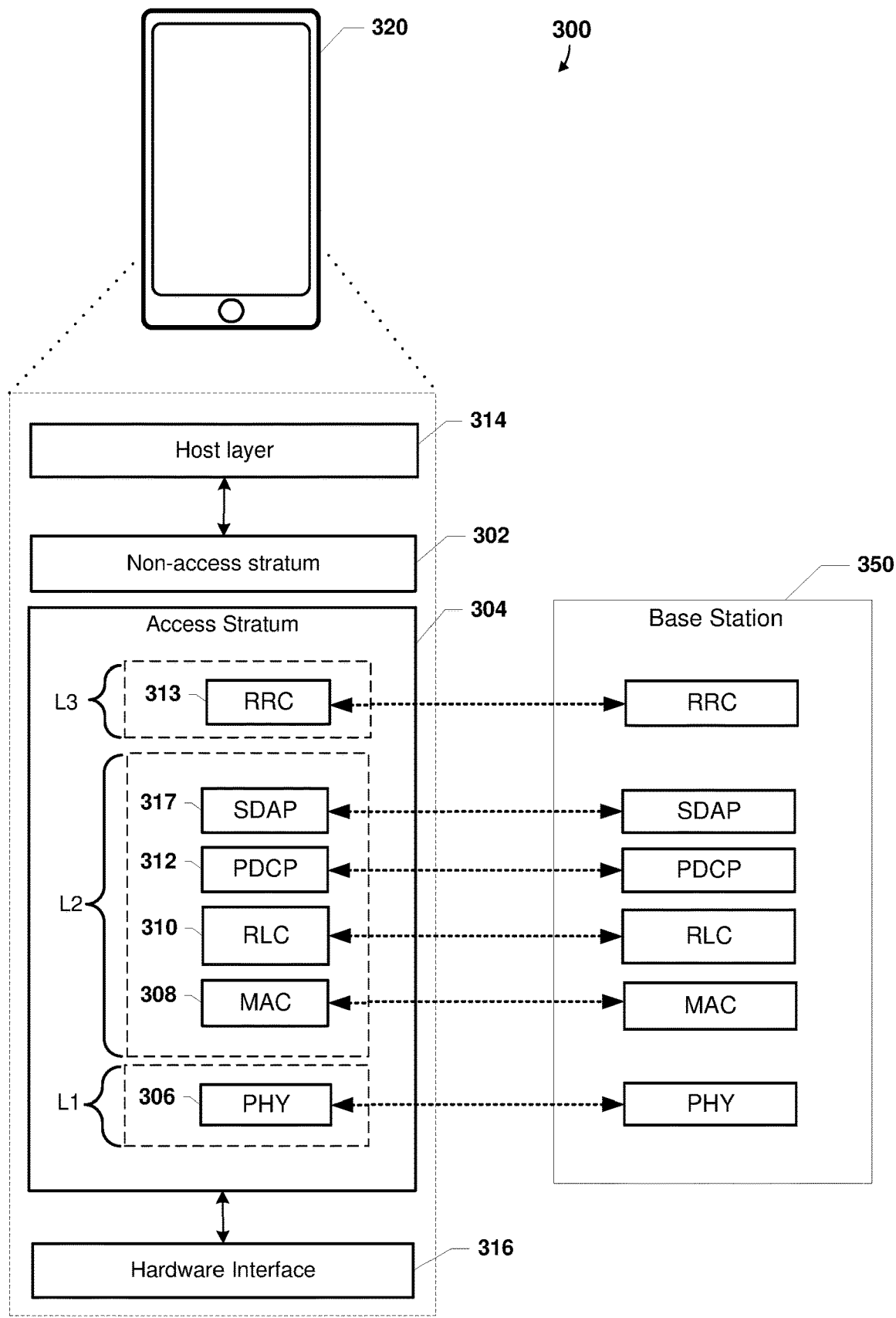
FIG. 3 is a component block diagram illustrating a software architecture including a radio protocol stack for the user and control planes in wireless communications suitable for implementing various embodiments.

FIG. 3 illustrates an example of a software architecture 300 including a radio protocol stack for the user and control planes in wireless communications between a base station 350 (e.g., the base station 110a) and a wireless device 320 (e.g., the wireless device 120a-120e, 200). With reference to FIGS. 1-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In some embodiments, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 120a-120e, the SDAP sublayer 317 may deliver DL received QoS flows to upper layers. In some embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., an Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
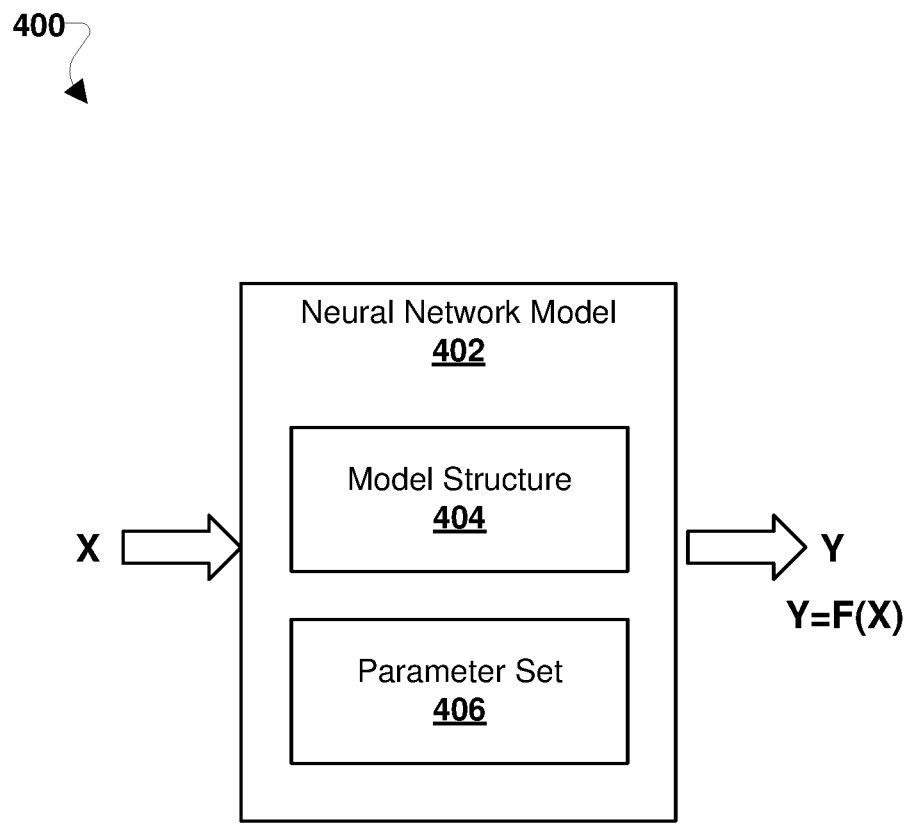
FIG. 4 is a conceptual block diagram illustrating an example neural network suitable for implementing any of the various embodiments.

FIG. 4 is a conceptual block diagram illustrating an example neural network 400 suitable for implementing any of the various embodiments. With reference to FIGS. 1-4, a wireless device (e.g., the wireless device 120a-120e, 200, 320) may implement the neural network 400 to manage TX timing of data transmissions to a base station (e.g., the base station 110a-110d, 350).

In various embodiments, the neural network 400 may include a neural network model 402. The neural network model 402 may include a model structure 404 and a parameter set 406. In some embodiments, the model structure 404 may include one or more nodes configured to operate on one or more parameters of the parameter set 406. In various embodiments, the neural network model may be configured to receive inputs X and provide as an output Y as a function of the inputs X (e.g., Y=F(X)).

In some embodiments, the model structure 404 may be identified by model identifier, which may include a default parameter set 406. In some embodiments, the model identifier may be unique in a communication network. In some embodiments, each model identifier may be associated with a specific neural network function. In some embodiments, the parameter set 406 may include one or more weight values of the neural network model 402 and/or other configuration parameters. In some embodiments, the parameter set 406 may include a variety of RF channel factors. In some embodiments, the RF channel factors may include current and/or predicted RF channel conditions. In some embodiments, the RF channel factors may include current and/or historical SNR, RSRP, RSRQ, DM RS, and/or CSI RS information; uplink grant information obtained from previously-received PDCCH messages; current and/or historical wireless device battery level information; DCI failure information and/or CRC failure information; wireless device location information; wireless device usage information; and/or the like.

In some embodiments, the neural network 400 may be configured (e.g., trained) to provide as an output (e.g., Y) a TX timing for a data transmission to a base station and a number of carriers for sending the data transmission. In some embodiments, the neural network 400 may be configured (e.g., trained) to predict RF conditions for a future period of time (e.g., X milliseconds) based on the plurality of RF channel factors (e.g., X). In some embodiments, the neural network 400 may be configured to determine a TX time and TX power for a data transmission that achieves at least a threshold level of throughput for the selected TX power. In some embodiments, the neural network 400 may be configured to predict RF conditions and to determine the TX time and TX power for a data transmission based on the predicted RF conditions. In some embodiments, the neural network 400 may be configured to predict PDCCH grant trends and to determine the TX time and TX power for a data transmission based on the predicted PDCCH grant trends. In some embodiments, the neural network 400 may be configured to provide as an output a prediction of RF conditions. In some embodiments, the neural network 400 may be configured to provide as an output a prediction of signal transmissions by one or more other wireless devices.

Figure 5:
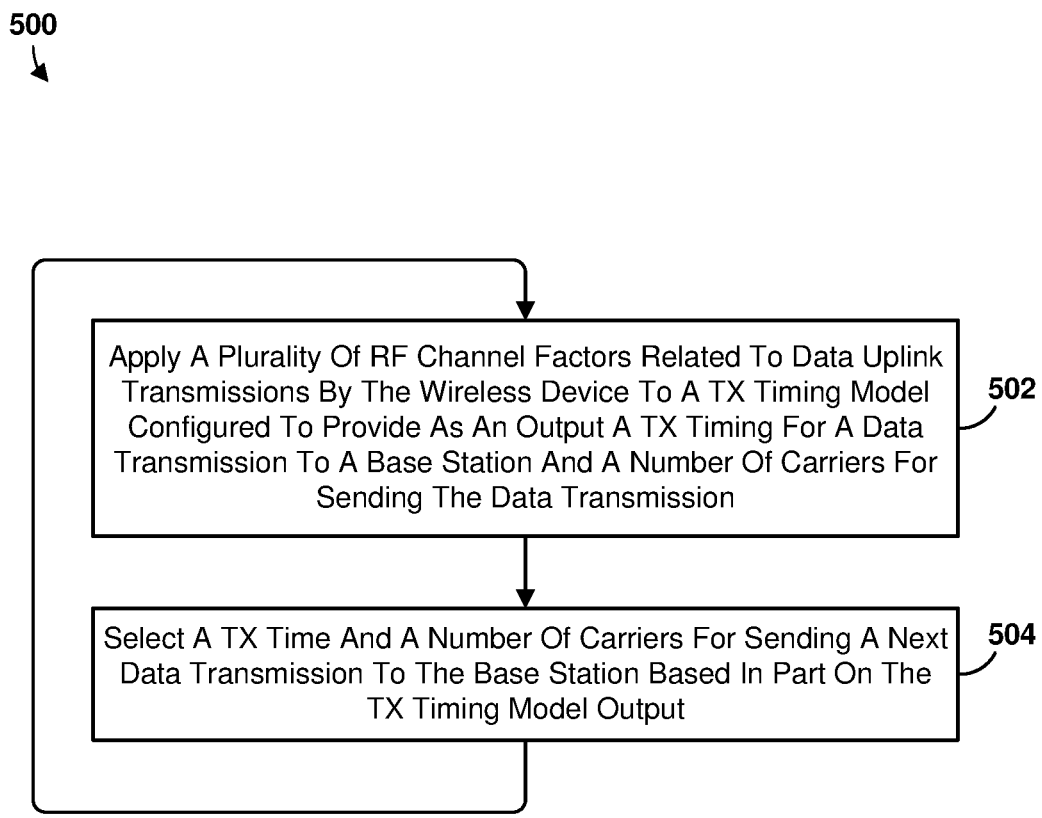
FIG. 5 is a process flow diagram illustrating a method that may be performed by a processor of a wireless device for managing TX timing of data transmissions in accordance with various embodiments.

FIG. 5 is a process flow diagram illustrating a method 500 that may be performed by a processor of a wireless device for managing TX timing of data transmissions in accordance with various embodiments. With reference to FIGS. 1-5, in various embodiments the method 500 may be implemented by a neural network (such as 400) executing on a processor (such as 210, 212, 214, 216, 252 or 260) of a wireless device (such as the wireless device 120a-120e, 200, 320).

In block 502, the processor may apply a plurality of RF channel factors related to data uplink transmissions by the wireless device to a TX timing model configured to provide as an output a TX timing for a data transmission to a base station and a number of carriers for sending the data transmission. In some embodiments, the processor may apply the plurality of RF channel factors related to data uplink transmissions by the wireless device to the TX timing model in response to storing data in an uplink buffer (e.g., when the wireless device has data for transmission to the base station). In some embodiments, the processor may apply the plurality of RF channel factors to the TX timing model from time to time (e.g., periodically). In some embodiments, the number of carriers for sending the data transmission provided as an output of the TX timing model may be based on a balancing of TX power required for the data transmission against TX performance of the data transmission.

In some embodiments, the RF channel factors evaluated by the TX timing model may include current and/or predicted RF channel conditions. In some embodiments, the neural network may be configured to provide as an output a number of carriers (e.g., aggregated carriers) to use for a data transmission. In some embodiments, the RF channel factors evaluated by the TX timing model may include current and/or historical SNR, RSRP, RSRQ, and/or the like. In some embodiments, the RF channel factors evaluated by the TX timing model may include current and/or DM RS information, CSI RS information, and/or the like. In some embodiments, the RF channel factors evaluated by the TX timing model may include uplink grant information obtained from previously-received PDCCH messages. In some embodiments, the RF channel factors evaluated by the TX timing model may include current and/or historical wireless device battery level information. In some embodiments, the RF channel factors evaluated by the TX timing model may include DCI failure information and/or CRC failure information.

In some embodiments, the RF channel factors may evaluated by the TX timing model include wireless device location information. In some embodiments, the RF channel factors evaluated by the TX timing model may include wireless device usage information (e.g., a number of transmissions or attempted transmissions per unit time, an amount of data transmitted in each transmission, and/or the like). In some embodiments, the plurality of RF channel factors evaluated by the TX timing model may include uplink transmissions of one or more other wireless devices.

In some embodiments, the TX timing model may be configured to provide as an output a TX power for the next data transmission. In some embodiments, the TX timing model may be configured to provide as an output a prediction of RF conditions, for example, for a future period of time (e.g., X milliseconds), based on the plurality of RF channel factors. In some embodiments, the TX timing model may be configured (e.g., trained) to provide as an output a TX timing for the next data transmission to the base station based on a prediction of RF channel conditions. In some embodiments, the TX timing model may be configured to provide as an output a prediction of signal transmission by one or more other wireless devices.

Means for performing the operations of block 502 include the processors 210, 212, 214, 216, 252, 260, and the wireless transceivers 256 and 266.

In block 504, the processor may selecting a TX time and a number of carriers for sending a next data transmission to the base station based in part on the TX timing model output. In some embodiments, the number of carriers for sending the data transmission provided as an output of the TX timing model may be based on a balancing of TX power and TX performance of the data transmission. In some embodiments, selecting a TX time for a next data transmission to the base station may be based in part on the TX timing model output comprises selecting an uplink opportunity granted to the wireless device in a PDCCH.

Means for performing the operations of block 504 include the processors 210, 212, 214, 216, 252, 260.

The processor may repeat the operations of blocks 502 and 504 from time to time, such as periodically or in response to a data message ready for transmission (e.g., stored in a transmit buffer).

Figure 6:
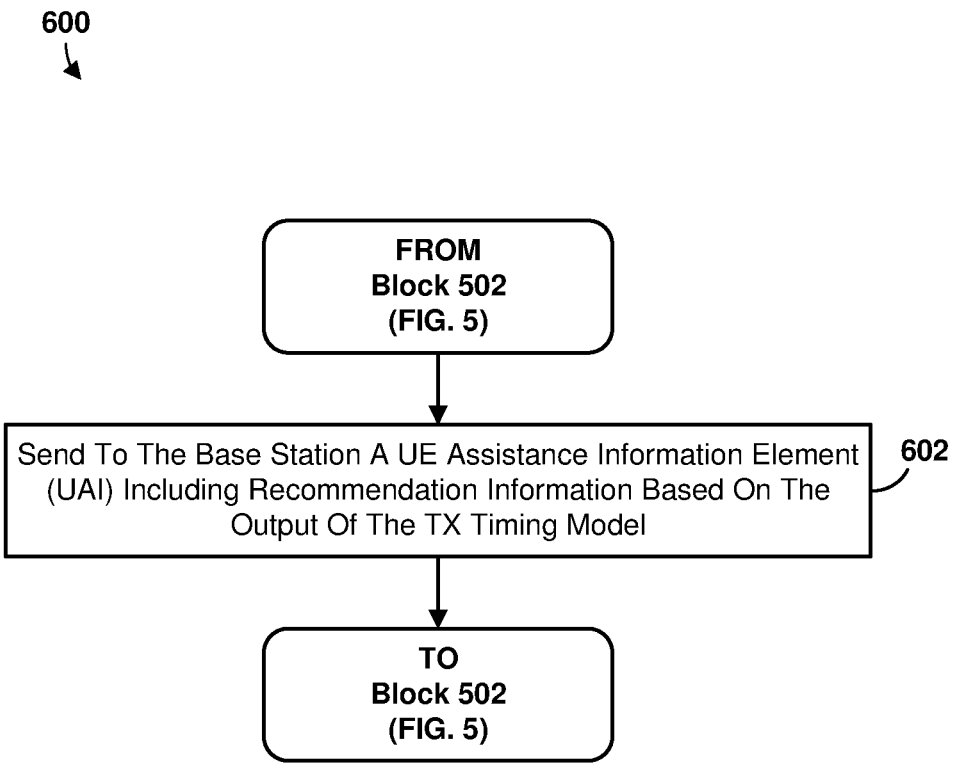
FIG. 6 is a process flow diagram illustrating operations that may be performed by a processor of a wireless device as part of the method for managing TX timing of data transmissions in accordance with various embodiments.

FIG. 6 is a process flow diagram illustrating operations 600 that may be performed by a processor of a wireless device as part of the method 500 for managing TX timing of data transmissions in accordance with various embodiments. With reference to FIGS. 1-6, in various embodiments the operations 600 may be implemented by a neural network (such as 400) executing on a processor (such as 210, 212, 214, 216, 252 or 260) of a wireless device (such as the wireless device 120a-120e, 200, 320).

Following outputs of the TX timing model in block 502, the processor may send to the base station a UE Assistance Information element (UAI) including recommendations or uplink transmission information based on the output of the TX timing model in block 602. In some embodiments, the recommendation information may include a recommended TX time for the wireless device to send the data transmission to the base station. In some embodiments, the recommendation information may include a recommended TX power for the wireless device to send the data transmission to the base station. In some embodiments, the recommendation information may include a recommended number of carriers for the wireless device to send the data transmission to the base station. In some embodiments, the recommendation information may include a recommendation of one or more carriers to be activated or deactivated. In some embodiments, the recommendation information may include a recommendation of one or more channels to activate or deactivate. In some embodiments, the recommendation information may include a recommendation of one or more connections to activate or deactivate (e.g., one or more RRC connections). In some embodiments, the recommendation information may include a recommendation to change one or more bandwidth parts (BWP). In some embodiments, the recommendation information may include a recommendation to change a large BWP to a small BWP and/or to change a small BWP to a large BWP. Means for performing the operations of block 602 include the processors 210, 212, 214, 216, 252, 260, and the wireless transceivers 256 and 266.

The processor may apply of the plurality of RF channel factors related to data uplink transmissions by the wireless device to the TX timing model in block 502 as described.

Figure 7:
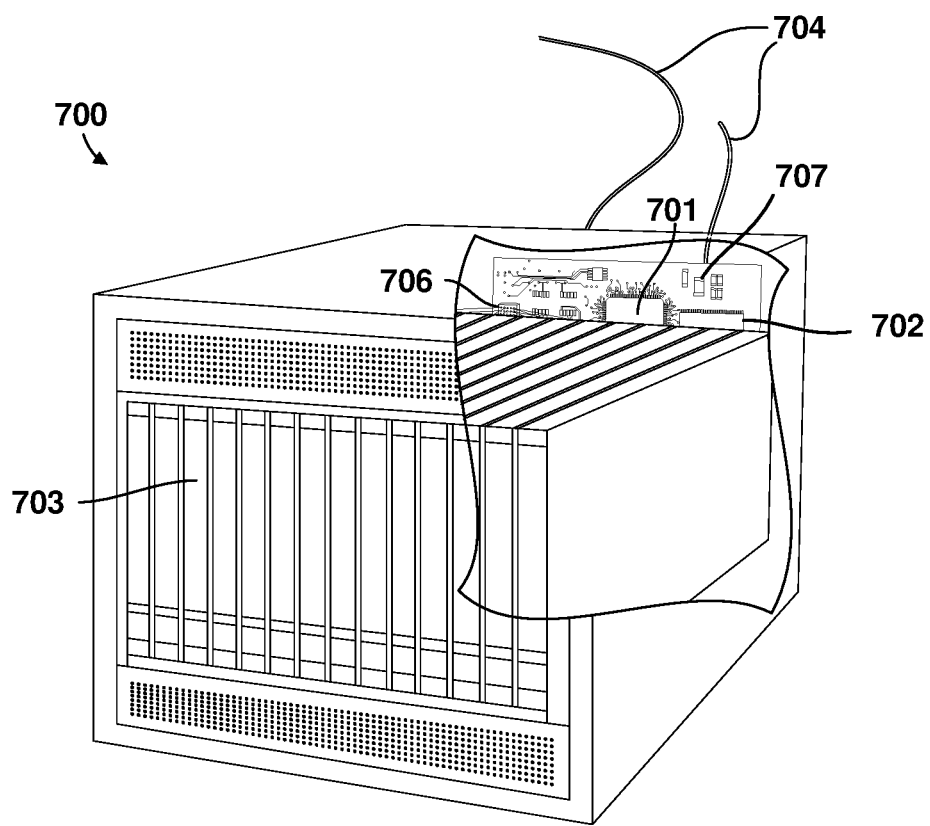
FIG. 7 is a component block diagram of a base station computing device suitable for use with various embodiments.

FIG. 7 is a component block diagram of a base station computing device suitable for use with various embodiments. Such base station computing devices (e.g., base station 110a-110d, 200, 350) may include at least the components illustrated in FIG. 7. With reference to FIGS. 1-7, the base station computing device 700 may typically include a processor 701 coupled to volatile memory 702 and a large capacity nonvolatile memory, such as a disk drive 703. The base station computing device 700 also may include a peripheral memory access device 706 such as a floppy disc drive, compact disc (CD) or digital video disc (DVD) drive coupled to the processor 701. The base station computing device 700 also may include network access ports 704 (or interfaces) coupled to the processor 701 for establishing data connections with a network, such as the Internet or a local area network coupled to other system computers and servers. The base station computing device 700 may include one or more antennas 707 for sending and receiving electromagnetic radiation that may be connected to a wireless communication link. The base station computing device 700 may include additional access ports, such as USB, Firewire, Thunderbolt, and the like for coupling to peripherals, external memory, or other devices.

Figure 8:
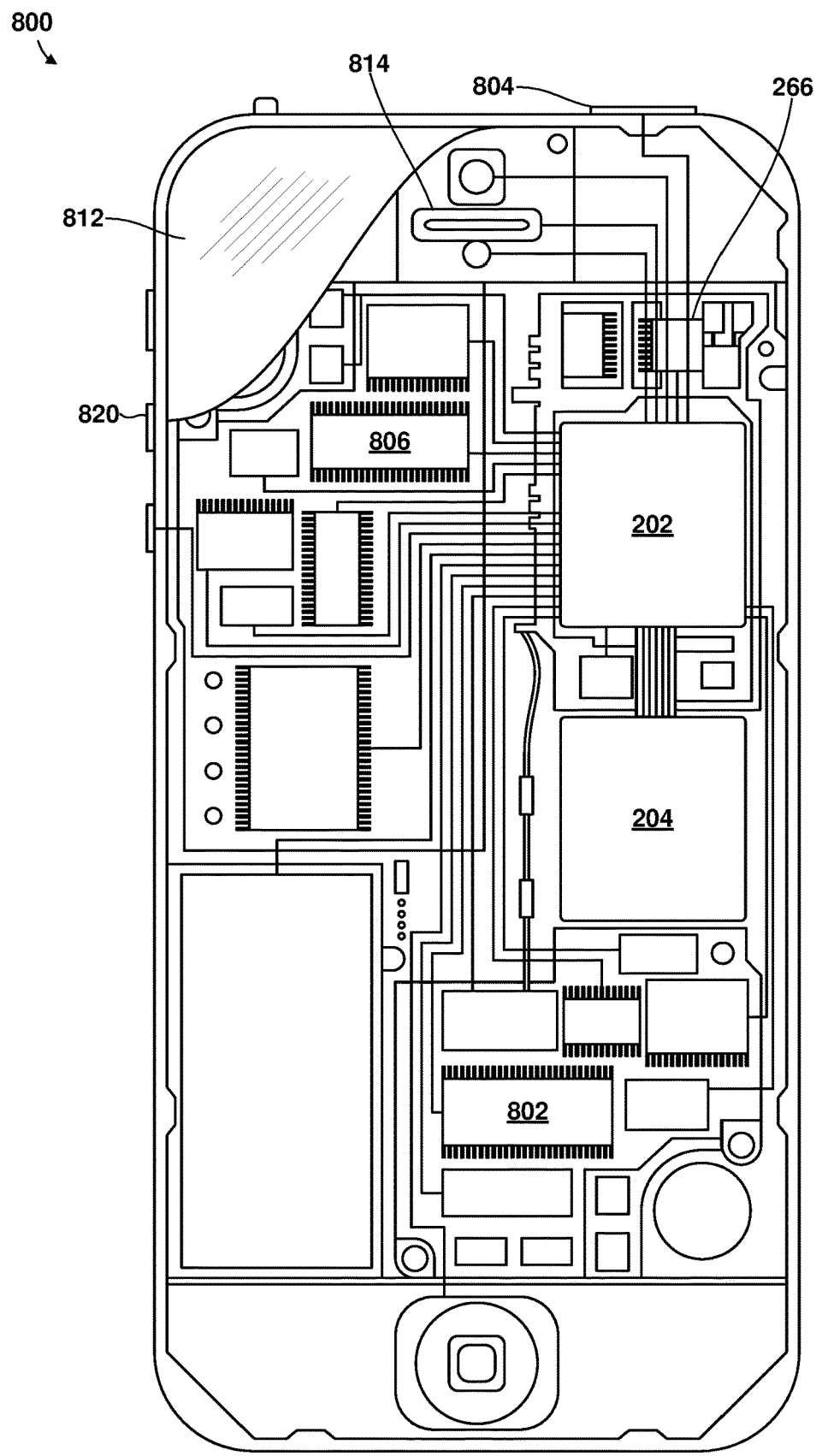
FIG. 8 is a component block diagram of a wireless device suitable for use with various embodiments.

FIG. 8 is a component block diagram of a wireless device 800 suitable for use with various embodiments. With reference to FIGS. 1-8, various embodiments may be implemented on a variety of wireless devices 800 (for example, the wireless device 120a-120e, 200, 320), an example of which is illustrated in FIG. 8 in the form of a smartphone. The wireless device 800 may include a first SOC 202 (for example, a SOC-CPU) coupled to a second SOC 204 (for example, a 5G capable SOC). The first and second SOCs 202, 204 may be coupled to internal memory 802, a display 812, and to a speaker 814. Additionally, the wireless device 800 may include an antenna 804 for sending and receiving electromagnetic radiation that may be connected to a wireless transceiver 266 coupled to one or more processors in the first and/or second SOCs 202, 204. Wireless device 800 may include menu selection buttons or rocker switches 820 for receiving user inputs.

The wireless device 800 wireless device 800 may include a sound encoding/decoding (CODEC) circuit 806, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 806 may include a digital signal processor (DSP) circuit (not shown separately).

The processors of the base station computing device 700 and the wireless device 800 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 702, 802 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods or operations 500 and 600 may be substituted for or combined with one or more operations of the methods or operations 500 and 600.

Implementation examples of wireless device embodiments are described in the following paragraphs. While some of the following implementation examples are described in terms of example methods, further example implementations may include: the example methods discussed in the following paragraphs implemented by a wireless device including an apparatus with a processing system configured with processor-executable instructions to perform operations of the methods of the following implementation examples; the example methods discussed in the following paragraphs implemented by a wireless device including means for performing functions of the methods of the following implementation examples; and the example methods discussed in the following paragraphs may be implemented as a non-transitory processor-readable storage medium having stored thereon processor-executable instructions configured to cause a processor of a wireless device to perform the operations of the methods of the following implementation examples.

Example 1. A method performed by a processor of a wireless device for managing transmit (TX) timing of data transmissions, including applying a plurality of radio frequency (RF) channel factors related to data uplink transmissions by the wireless device to a TX timing model configured to provide as an output a TX timing for a data transmission to a base station and a number of carriers for sending the data transmission; and selecting a TX time and a number of carriers for sending a next data transmission to the base station based in part on the TX timing model output.

Example 2. The method of example 1, in which the number of carriers for sending the data transmission provided as an output of the TX timing model is based on a balancing of TX power and TX performance of the data transmission.

Example 3. The method of any of examples 1 or 2, in which the TX timing model is configured to perform a maximization operation of a TX performance value multiplied by a TX performance weight value less a TX power value multiplied by a TX power weight value.

Example 4. The method of any of examples 1-3, in which applying a plurality of RF channel factors related to data uplink transmissions by the wireless device to a TX timing model configured to provide as an output TX timing for a data transmission to a base station is performed in response to storing data in an uplink buffer.

Example 5. The method of any of examples 1-4, in which applying a plurality of RF channel factors related to data uplink transmissions by the wireless device to a TX timing model configured to provide as an output TX timing for a data transmission to a base station is performed periodically.

Example 6. The method of any of examples 1-5, in which selecting a TX time for a next data transmission to the base station based in part on the TX timing model output includes selecting an uplink (UL) opportunity granted to the wireless device in a received physical downlink control channel (PDCCH).

Example 7. The method of any of examples 1-6, in which the TX timing model is configured to provide as an output a TX power for the next data transmission.

Example 8. The method of any of examples 1-7, in which the TX timing model is configured to provide as an output the TX timing for the next data transmission to the base station based on a prediction of RF channel conditions.

Example 9. The method of any of examples 1-8, further including sending to the base station a UE Assistance Information element (UAI) including recommendation information based on the output of the TX timing model.

Example 10. The method of any of examples 1-9, in which the plurality of RF channel factors over a period of time applied to the TX timing model comprise one or more of a signal to noise ratio (SNR), a reference signal receive power (RSRP), a reference signal receive quality (RSRQ), demodulation reference signal (DMRS) information, or channel state information reference signal (CSI RS) information.

Example 11. The method of any of examples 1-10, in which the plurality of RF channel factors applied to the TX timing model comprise uplink grant information obtained from previously-received physical downlink control channel (PDCCH) messages.

Example 12. The method of any of examples 1-11, in which the plurality of RF channel factors applied to the TX timing model comprise wireless device battery level information.

Example 13. The method of any of examples 1-12, in which the plurality of RF channel factors applied to the TX timing model comprise one or more of downlink control information (DCI) failure information or cyclic redundancy check (CRC) failure information.

Example 14. The method of any of examples 1-13, in which the plurality of RF channel factors applied to the TX timing model comprise wireless device location information.

Example 15. The method of any of examples 1-14, in which the plurality of RF channel factors applied to the TX timing model comprise wireless device usage information.

Example 16. The method of any of examples 1-15, in which the plurality of RF channel factors applied to the TX timing model comprise uplink transmissions of one or more other wireless devices.

Example 17. The method of any of examples 1-16, in which the TX timing model is configured to provide as an output a prediction of RF conditions.

Example 18. The method of any of examples 1-17, in which the TX timing model is configured to identify a TX timing that balances TX power against wireless device power consumption.

Example 19. The method of any of examples 1-18, in which the TX timing model is configured to identify a TX timing based on a balancing of TX power and a wireless device-indicated threshold TX performance of the data transmission.

Example 20. The method of any of examples 1-19, in which the TX timing model is configured to identify a TX timing based on a balancing of TX performance of the data transmission and a predicted RF peak.

Example 21. The method of any of examples 1-20, in which the TX timing model is configured to identify a TX timing based on a balancing of TX power against a predicted signal transmission by one or more other wireless devices.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for managing transmit (TX) timing of data transmissions, comprising:
    applying a plurality of radio frequency (RF) channel factors related to data uplink transmissions by the wireless device to a TX timing model configured to provide as an output a TX timing for a data transmission to a base station and a number of carriers for sending the data transmission; and
    selecting a TX time and a number of carriers for sending a next data transmission to the base station based in part on the TX timing model output;
    wherein the TX timing model is configured to perform a maximization operation of a TX performance value multiplied by a TX performance weight value less a TX power value multiplied by a TX power weight value.

2. The method of claim 1, wherein the number of carriers for sending the data transmission provided as an output of the TX timing model is based on a balancing of TX power and TX performance of the data transmission.

3. The method of claim 1, wherein applying the plurality of RF channel factors related to data uplink transmissions by the wireless device to the TX timing model configured to provide as the output TX timing for the data transmission to the base station is performed in response to storing data in an uplink buffer.

4. The method of claim 1, wherein applying the plurality of RF channel factors related to data uplink transmissions by the wireless device to the TX timing model configured to provide as the output TX timing for the data transmission to the base station is performed periodically.

5. The method of claim 1, wherein selecting the TX time for a next data transmission to the base station based in part on the TX timing model output comprises selecting an uplink (UL) opportunity granted to the wireless device in a received physical downlink control channel (PDCCH).

6. The method of claim 1, wherein the TX timing model is configured to provide as an output a TX power for the next data transmission.

7. The method of claim 1, wherein the TX timing model is configured to provide as an output the TX timing for the next data transmission to the base station based on a prediction of RF channel conditions.

8. The method of claim 1, further comprising sending to the base station a UE Assistance Information element (UAI) including recommendation information based on the output of the TX timing model.

9. The method of claim 1, wherein the plurality of RF channel factors over a period of time applied to the TX timing model comprise one or more of a signal to noise ratio (SNR), a reference signal receive power (RSRP), a reference signal receive quality (RSRQ), demodulation reference signal (DMRS) information, or channel state information reference signal (CSI RS) information.

10. The method of claim 1, wherein the plurality of RF channel factors applied to the TX timing model comprise uplink grant information obtained from previously-received physical downlink control channel (PDCCH) messages.

11. The method of claim 1, wherein the plurality of RF channel factors applied to the TX timing model comprise wireless device battery level information.

12. The method of claim 1, wherein the plurality of RF channel factors applied to the TX timing model comprise one or more of downlink control information (DCI) failure information or cyclic redundancy check (CRC) failure information.

13. The method of claim 1, wherein the plurality of RF channel factors applied to the TX timing model comprise wireless device location information.

14. The method of claim 1, wherein the plurality of RF channel factors applied to the TX timing model comprise wireless device usage information.

15. The method of claim 1, wherein the plurality of RF channel factors applied to the TX timing model comprise uplink transmissions of one or more other wireless devices.

16. The method of claim 1, wherein the TX timing model is configured to provide as an output a prediction of RF conditions.

17. The method of claim 1, wherein the TX timing model is configured to identify a TX timing that balances TX power against wireless device power consumption.

18. The method of claim 1, wherein the TX timing model is configured to identify a TX timing based on a balancing of TX power and a wireless device-indicated threshold TX performance of the data transmission.

19. The method of claim 1, wherein the TX timing model is configured to identify a TX timing based on a balancing of TX performance of the data transmission and a predicted RF peak.

20. The method of claim 1, wherein the TX timing model is configured to identify a TX timing based on a balancing of TX power against a predicted signal transmission by one or more other wireless devices.

21. A wireless device, comprising:
    a processor configured to:
        apply a plurality of radio frequency (RF) channel factors related to data uplink transmissions to a TX timing model configured to provide as an output a TX timing for a data transmission to a base station and a number of carriers for sending the data transmission; and
        select a TX time and a number of carriers for sending a next data transmission to the base station based in part on the TX timing model output;
        wherein the processor is further configured such that the TX timing model is configured to perform a maximization operation of a TX performance value multiplied by a TX performance weight value less a TX power value multiplied by a TX power weight value.

22. The wireless device of claim 21, wherein the processor is further configured such that the number of carriers for sending the data transmission provided as an output of the TX timing model is based on a balancing of TX power and TX performance of the data transmission.

23. The wireless device of claim 21, wherein the processor is further configured to apply the plurality of RF channel factors related to data uplink transmissions to the TX timing model configured to provide as the output TX timing for the data transmission to the base station in response to storing data in an uplink buffer.

24. The wireless device of claim 21, wherein the processor is further configured to periodically apply the plurality of RF channel factors related to data uplink transmissions by the wireless device to the TX timing model configured to provide as the output TX timing for the data transmission to the base station.

25. The wireless device of claim 21, wherein the processor is further configured with processor-executable instructions such that the TX timing model is configured to provide as an output a TX power for the next data transmission.

26. The wireless device of claim 21, wherein the processor is further configured with processor-executable instructions such that the TX timing model is configured to provide as an output the TX timing for the next data transmission to the base station based on a prediction of RF channel conditions.

27. A wireless device, comprising:
   means for applying a plurality of radio frequency (RF) channel factors related to data uplink transmissions to a TX timing model configured to provide as an output a TX timing for a data transmission to a base station and a number of carriers for sending the data transmission; and
   means for selecting a TX time and a number of carriers for sending a next data transmission to the base station based in part on the TX timing model output;
   wherein the TX timing model is configured to perform a maximization operation of a TX performance value multiplied by a TX performance weight value less a TX power value multiplied by a TX power weight value.

28. A non-transitory processor-readable medium having stored thereon processor-executable instruction configured to cause a processor in a wireless device to perform operations comprising:
   applying a plurality of radio frequency (RF) channel factors related to data uplink transmissions to a TX timing model configured to provide as an output a TX timing for a data transmission to a base station and a number of carriers for sending the data transmission; and
   selecting a TX time and a number of carriers for sending a next data transmission to the base station based in part on the TX timing model output;
   wherein the TX timing model is configured to perform a maximization operation of a TX performance value multiplied by a TX performance weight value less a TX power value multiplied by a TX power weight value.

* * * * *